US012691743B2

(12) United States Patent
Beange et al.

(10) Patent No.: US 12,691,743 B2
(45) Date of Patent: Jul. 28, 2026

(54) ENERGY STORAGE SYSTEM FOR VEHICLE AND ALIGNMENT SYSTEM FOR SAME

(71) Applicant: Joy Global Underground Mining LLC, Warrendale, PA (US)

(72) Inventors: Craig Beange, Lively (CA); Daniel Black, Whitefish (CA); Ryan Karns, Hanmer (CA)

(73) Assignee: Joy Global Underground Mining LLC, Warrendale, PA (US)

( * ) Notice: Subject to any disclaimer, the term of this patent is extended or adjusted under 35 U.S.C. 154(b) by 195 days.

(21) Appl. No.: 18/506,823

(22) Filed: Nov. 10, 2023

(65) Prior Publication Data

US 2024/0157777 A1      May 16, 2024

Related U.S. Application Data

(60) Provisional application No. 63/426,662, filed on Nov. 18, 2022, provisional application No. 63/424,727, filed on Nov. 11, 2022.

(51) Int. Cl.
*B60K 1/04* (2019.01)
*F15B 15/00* (2006.01)
(Continued)

(52) U.S. Cl.
CPC ................ *B60K 1/04* (2013.01); *F15B 15/00* (2013.01); *H01M 50/249* (2021.01);
(Continued)

(58) Field of Classification Search
CPC ............ B60K 1/04; B60K 2001/0416; H01M 50/249; H01M 50/262; H01M 2220/20; F15B 15/00; B60L 50/66; B60L 2200/40
(Continued)

(56) References Cited

U.S. PATENT DOCUMENTS

| | | | |
|---|---|---|---|
| 3,683,255 A | 8/1972 | Schroeder |
| 4,265,587 A | 5/1981 | Clark |

(Continued)

FOREIGN PATENT DOCUMENTS

| | | |
|---|---|---|
| CN | 112324491 A | 5/2021 |
| WO | 9954158 A1 | 10/1999 |

OTHER PUBLICATIONS

International Search Report and Written Opinion for Application No. PCT/US23/79394, dated Apr. 4, 2024, 10 pages.
(Continued)

*Primary Examiner* — James A Shriver, II
*Assistant Examiner* — Hilary L Johns
(74) *Attorney, Agent, or Firm* — Husch Blackwell LLP

(57) ABSTRACT

An energy storage system is removably coupled to a vehicle and includes a frame, a battery supported on the frame, and a frame alignment system. The frame includes a base configured to rest on a support surface while the frame is uncoupled from the vehicle, and a first mounting feature configured to engage a complementary second mounting feature positioned on the vehicle. The battery is configured to provide power to the vehicle while the energy storage system is coupled to the vehicle. The frame alignment system includes a guide surface configured to engage the second mounting feature as the frame is coupled to the vehicle, the engagement between the guide surface and the second mounting feature facilitating alignment between the first mounting feature and the second mounting feature.

21 Claims, 16 Drawing Sheets

(51) Int. Cl.
| | |
|---|---|
| *H01M 50/249* | (2021.01) |
| *H01M 50/262* | (2021.01) |
| *B60L 50/60* | (2019.01) |

(52) U.S. Cl.
CPC ... *H01M 50/262* (2021.01); *B60K 2001/0416* (2013.01); *B60L 50/66* (2019.02); *B60L 2200/40* (2013.01); *H01M 2220/20* (2013.01)

(58) Field of Classification Search
USPC ....................................................... 180/68.5
See application file for complete search history.

(56) References Cited

U.S. PATENT DOCUMENTS

| | | | |
|---|---|---|---|
| 4,397,365 | A | 8/1983 | Harbe et al. |
| 4,422,814 | A | 12/1983 | Borders |
| 5,003,236 | A | 3/1991 | Harless |
| 5,112,113 | A | 5/1992 | Wagner et al. |
| 5,156,230 | A | 10/1992 | Washburn |
| 5,163,537 | A | 11/1992 | Radev |
| 5,238,298 | A | 8/1993 | Wagner et al. |
| 5,297,921 | A | 3/1994 | Springer et al. |
| 5,542,488 | A | 8/1996 | Nixon |
| 5,549,443 | A | 8/1996 | Hammerslag |
| 5,612,606 | A | 3/1997 | Guimarin et al. |
| 5,760,569 | A | 6/1998 | Chase, Jr. |
| 5,855,467 | A | 1/1999 | Clonch et al. |
| 5,951,229 | A | 9/1999 | Hammerslag |
| 5,998,963 | A | 12/1999 | Aarseth |
| 6,113,342 | A * | 9/2000 | Smith ..................... B60L 50/66<br>180/68.5 |
| 6,994,560 | B2 | 2/2006 | Kohchi |
| 7,201,384 | B2 | 4/2007 | Chaney |
| 7,520,355 | B2 | 4/2009 | Chaney |
| 8,146,694 | B2 | 4/2012 | Hamidi |
| 8,164,300 | B2 | 4/2012 | Agassi et al. |
| 8,516,687 | B2 | 8/2013 | Hozumi et al. |
| 8,963,495 | B2 | 2/2015 | Park et al. |
| 9,177,306 | B2 | 11/2015 | Penilla et al. |
| 9,352,728 | B2 | 5/2016 | Corfitsen |
| 9,358,895 | B2 | 6/2016 | Avganim |
| 9,932,019 | B2 | 4/2018 | Hassounah |
| 9,937,818 | B2 | 4/2018 | Newman |
| 9,944,140 | B2 | 4/2018 | Springer |
| 9,969,283 | B2 | 5/2018 | Deahl et al. |
| 10,044,012 | B2 | 8/2018 | Sham |
| 10,112,471 | B2 | 10/2018 | Higuchi et al. |
| 10,252,632 | B2 | 4/2019 | Hernandez Lopez et al. |
| 10,668,830 | B2 | 6/2020 | Huff et al. |
| 10,800,266 | B2 | 10/2020 | Sponheimer et al. |
| 10,833,379 | B2 | 11/2020 | Scaringe et al. |
| 10,906,383 | B2 * | 2/2021 | Huff ..................... B60K 17/354 |
| 10,926,660 | B2 | 2/2021 | Hickey et al. |
| 10,974,614 | B2 | 4/2021 | Huff et al. |
| 11,241,974 | B2 | 2/2022 | Huff et al. |
| 11,254,224 | B2 * | 2/2022 | Hickey ..................... B60K 1/04 |
| 11,305,746 | B2 | 4/2022 | Hickey |
| 11,367,908 | B2 | 6/2022 | Rogers |
| 11,396,237 | B2 * | 7/2022 | Hickey ..................... B60L 50/64 |
| D959,501 | S | 8/2022 | Hickey et al. |
| 11,400,829 | B1 | 8/2022 | Hajimiri |
| 11,414,134 | B2 | 8/2022 | Timofeev et al. |
| 11,453,309 | B2 | 9/2022 | Huff et al. |
| 11,456,554 | B2 | 9/2022 | Springer et al. |
| 11,597,294 | B2 | 3/2023 | Hickey |
| 2003/0150352 | A1 | 8/2003 | Kumar |
| 2003/0205421 | A1 | 11/2003 | Allen et al. |
| 2003/0209375 | A1 | 11/2003 | Suzuki et al. |
| 2005/0100767 | A1 | 5/2005 | Stolmar |
| 2006/0005737 | A1 | 1/2006 | Kumar |
| 2006/0061309 | A1 | 3/2006 | Rudinec |
| 2006/0273756 | A1 | 12/2006 | Bowling et al. |
| 2009/0294191 | A1 | 12/2009 | Sheidler et al. |
| 2010/0145717 | A1 | 6/2010 | Hoeltzel |
| 2011/0113609 | A1 | 5/2011 | Berdelle-Hilge et al. |
| 2011/0123309 | A1 | 5/2011 | Berdelle-Hilge et al. |
| 2011/0251935 | A1 | 10/2011 | German et al. |
| 2011/0301794 | A1 | 12/2011 | Bastien |
| 2012/0018235 | A1 | 1/2012 | O'Quinn et al. |
| 2012/0175209 | A1 | 7/2012 | Mazumdar et al. |
| 2012/0217074 | A1 | 8/2012 | Rudinec |
| 2012/0273285 | A1 | 11/2012 | Jensen et al. |
| 2012/0298004 | A1 | 11/2012 | Osara et al. |
| 2012/0304866 | A1 | 12/2012 | Barrett |
| 2012/0315117 | A1 | 12/2012 | Gilland et al. |
| 2013/0048382 | A1 | 2/2013 | Rudinec |
| 2013/0104768 | A1 | 5/2013 | Graham |
| 2013/0328393 | A1 | 12/2013 | Bullock |
| 2014/0369798 | A1 | 12/2014 | Escande et al. |
| 2015/0071747 | A1 | 3/2015 | Deahl et al. |
| 2016/0001748 | A1 | 1/2016 | Moskowitz |
| 2016/0118828 | A1 | 4/2016 | Berry et al. |
| 2016/0156075 | A1 | 6/2016 | Lindholm |
| 2017/0297541 | A1 | 10/2017 | Droste |
| 2018/0111496 | A1 | 4/2018 | Cholewa et al. |
| 2018/0264965 | A1 | 9/2018 | Huff et al. |
| 2018/0334782 | A1 | 11/2018 | Huff et al. |
| 2019/0061544 | A1 | 2/2019 | Jansen et al. |
| 2019/0210478 | A1 | 7/2019 | Mazumdar |
| 2019/0255962 | A1 | 8/2019 | Vare et al. |
| 2019/0263242 | A1 * | 8/2019 | Huff ..................... B60K 7/0007 |
| 2019/0329670 | A1 | 10/2019 | Kouvo et al. |
| 2020/0175551 | A1 | 6/2020 | Penilla et al. |
| 2020/0254898 | A1 | 8/2020 | Singhal |
| 2020/0331358 | A1 | 10/2020 | Lee |
| 2020/0341439 | A1 | 10/2020 | Valin |
| 2020/0353838 | A1 | 11/2020 | Zhang et al. |
| 2020/0384869 | A1 * | 12/2020 | Hickey ................... B60L 53/80 |
| 2021/0046814 | A1 | 2/2021 | Huff et al. |
| 2021/0159567 | A1 | 5/2021 | Parker et al. |
| 2021/0268930 | A1 | 9/2021 | Zhang et al. |
| 2022/0032796 | A1 | 2/2022 | Salter et al. |
| 2022/0097535 | A1 * | 3/2022 | Hickey ..................... B60K 1/00 |
| 2022/0097554 | A1 | 3/2022 | Hickey |
| 2022/0111753 | A1 | 4/2022 | Zhang et al. |
| 2022/0242249 | A1 | 8/2022 | Verho et al. |
| 2022/0348107 | A1 | 11/2022 | Hajimiri |
| 2023/0069338 | A1 | 3/2023 | Huang et al. |
| 2023/0070279 | A1 | 3/2023 | Wheeler et al. |

OTHER PUBLICATIONS

International Search Report and Written Opinion for Application No. PCT/US23/79416, dated Apr. 4, 2024, 12 pages.

Swedish Office Action for Application No. 2550509-0, dated Jan. 27, 2026, 9 pages.

Chilean Examiner's Report for Application No. 202501360 dated Apr. 6, 2026, 20 pages with Statement of Relevance.

Chilean Examiner's Report for Application No. 202501357 dated Mar. 30, 2026, 18 pages with Statement of Relevance.

* cited by examiner

ENERGY STORAGE SYSTEM FOR VEHICLE AND ALIGNMENT SYSTEM FOR SAME

CROSS-REFERENCE TO RELATED APPLICATIONS

This application claims the benefit of U.S. Provisional Patent Application No. 63/424,727, filed Nov. 11, 2022, and U.S. Provisional Patent Application No. 63/426,662, filed Nov. 18, 2022. The entire contents of these documents are incorporated by reference herein.

FIELD

The present disclosure relates to mining machines, and more specifically, to electric powered mining machines.

A mining machine may be powered by, for example, an energy storage system (e.g., a battery). The energy storage system may be removably coupled to a frame of the mining machine.

SUMMARY

In one independent aspect, an energy storage system is removably coupled to a vehicle. The energy storage system includes a frame, a battery supported on the frame, and a frame alignment system. The frame includes a base configured to rest on a surface while the frame is uncoupled from the vehicle, and a first mounting feature configured to engage a complementary second mounting feature positioned on the vehicle. The battery is configured to provide power to the vehicle while the energy storage system is coupled to the vehicle. The frame alignment system includes a guide surface configured to engage the second mounting feature as the frame is coupled to the vehicle. The engagement between the guide surface and the second mounting feature facilitates alignment between the first mounting feature and the second mounting feature.

In some aspects, the frame alignment system further includes a wear member supported proximate the first mounting feature, the wear member configured to engage an end of the second mounting feature.

In some aspects, the guide surface is a first guide surface positioned adjacent a first side of the frame. The wear member is a first wear member positioned adjacent an inner end of the first guide surface, and the frame alignment system further includes a second guide surface positioned adjacent a second side of the frame, and a second wear member supported proximate the first mounting feature and positioned adjacent an inner end of the second guide surface.

In some aspects, the first mounting feature includes a bar extending between a first alignment plate and a second alignment plate.

In some aspects, the bar extends from a first sidewall, through the first guide surface and the second guide surface.

In some aspects, the frame further includes a recessed surface, wherein the guide surface extends from a side surface toward the recessed surface.

In some aspects, the guide surface includes a first portion and a second portion, the first portion oriented at an acute angle relative to a side of the frame and extending inwardly from the side of the frame, the second portion orientation substantially parallel to the side of the frame.

In some aspects, the guide surface is positioned adjacent an end surface of the frame and recessed relative to the end surface.

In another independent aspect, a system for coupling an energy storage system to a vehicle includes: a first mounting interface configured to be positioned on one of the energy storage system and the vehicle, the first mounting interface including a mounting member; a second mounting interface configured to be positioned on the other of the energy storage system and the vehicle, the second mounting interface includes an arm and a latch member coupled to the arm, the latch member engageable with the mounting member; and a frame alignment system positioned on one of the energy storage system and the vehicle, the frame alignment system configured to guide the arm toward the mounting member.

In some aspects, the latch member includes a mounting hook positioned adjacent an end of the arm.

In some aspects, the arm is a first arm, the second mounting interface further including a second arm and a crossbar connecting the first arm and the second arm such that a position of the first arm relative to the second arm is fixed.

In some aspects, a guide surface is configured to induce adjustment of the first arm relative to the mounting member, the guide surface inducing a corollary position adjustment of the second arm as the position of the first arm is adjusted.

In some aspects, the guide surface is a first guide surface, the frame alignment system including a second guide surface configured to induce adjustment of the second arm relative to the mounting member, the second guide surface inducing a corollary position adjustment of the first arm as the position of the second arm is adjusted.

In some aspects, the frame alignment system further includes a first wear member engageable with the first arm and a second wear member engageable with the second arm. Each of the first wear member and the second wear member has an inner edge and an outer edge such that the inner edges of the first wear member and the second wear member face each other.

In some aspects, a first distance between the inner edges of the first wear member and the second wear member is less than a second distance between the first arm and the second arm, and wherein a third distance between the outer edge of the first wear member and the outer edge of the second wear member is greater than the second distance between the first arm and the second arm.

In some aspects, the frame alignment system further includes a wear member supported adjacent an inner edge of the guide surface, and wherein engagement of the arm and the guide surface guides the arm toward the wear member.

In some aspects, the second mounting interface further includes an actuator operable to rotate the arm into engagement with the mounting member to lift and mount the energy storage system to the vehicle.

In yet another independent aspect, a method of mounting an energy storage system to a vehicle includes: positioning the vehicle adjacent the energy storage system; operating the vehicle to move an arm positioned on the vehicle toward the energy storage system; and engaging, with the arm, a guide surface on the energy storage system to align the arm with a mounting member on the energy storage system.

In some aspects, the method further comprises rotating the arm into engagement with the mounting member such that a latch coupled to the arm engages a wear member.

In some aspects, the method further comprises pivoting the arm, thereby lifting the energy storage system and causing an end surface of the energy storage system to be drawn against an end surface of the vehicle.

Other aspects will become apparent by consideration of the detailed description and accompanying drawings.

DETAILED DESCRIPTION

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. Unless specified or limited otherwise, the terms "mounted," "connected," "supported," and "coupled" and variations thereof are used broadly and encompass both direct and indirect mountings, connections, supports, and couplings. Terms of degree, such as "substantially," "about," "approximately," etc. are understood by those of ordinary skill to refer to reasonable ranges outside of the given value, for example, tolerances associated with manufacturing, assembly, and use of the described embodiments.

Figure 1:
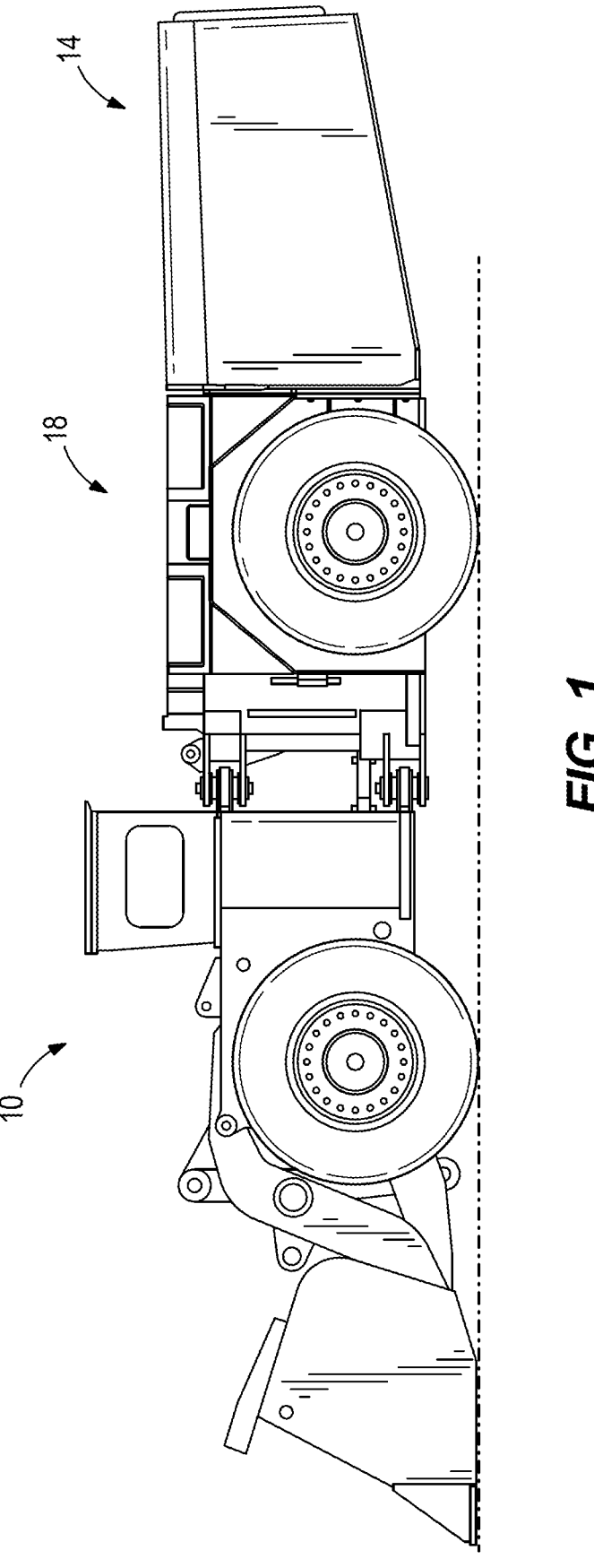
FIG. 1 is a side view of a battery mounting system including an energy storage system and an electric mining machine.

FIG. 1 illustrates a chassis 18 of a vehicle 10 (e.g., a mining machine, such as an LHD machine) including a battery mounting system for an energy storage system 14. The energy storage system 14 is removably coupled to the chassis 18 to provide power to the vehicle 10. The energy storage system 14 may be uncoupled from the chassis 18 (e.g., for charging and/or storage) and replaced with another energy storage system 14.

Figure 2:
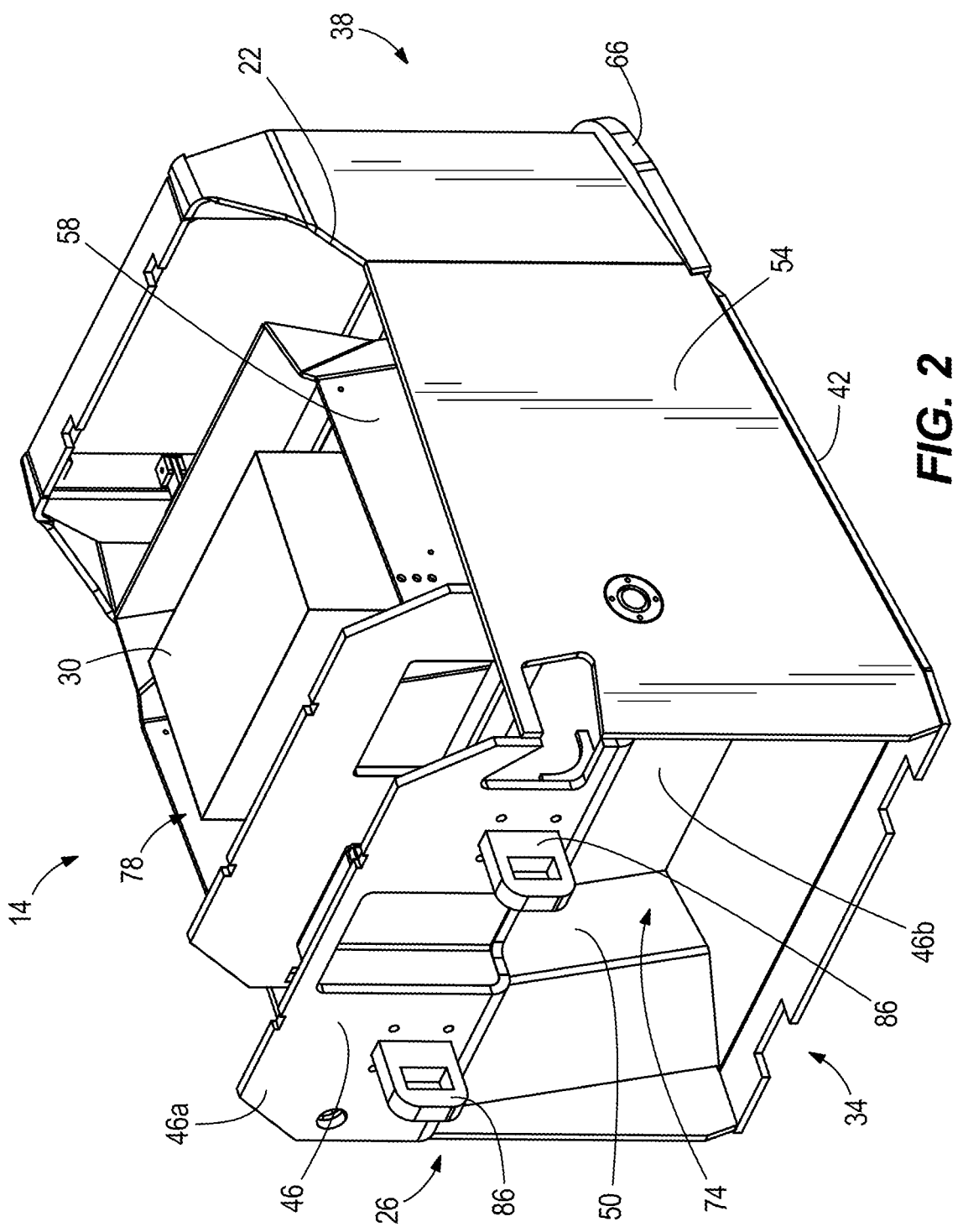
FIG. 2 is a perspective view of the energy storage system.

As shown in FIG. 2, the energy storage system 14 includes a frame 22 and a mounting interface 26. The frame 22 receives and supports a battery 30. The battery 30 is configured to supply power to the chassis 18 while the energy storage system 14 is mounted to the chassis 18. The mounting interface 26 is selectively engageable with the chassis 18 to mount the energy storage system 14 to the chassis 18.

As illustrated in FIG. 2, the frame 22 includes a first end 34, a second end 38, a base 42 extending between the first end 34 and the second end 38, a first side wall 50 that extends between the first end 34 and the second end 38, a second side wall 54 opposite the first side wall 50 and extending between the first end 34 and the second end 38, and a battery compartment 58. The battery compartment 58 is positioned between the first end 34, the first side wall 50, the second side wall 54, and the second end 38, and the battery compartment 58 includes a battery cavity 78 that within which the battery 30 is supported. In the illustrated embodiment, the first end 34 includes a mounting feature, which may include a stepped surface 46. The frame 22 receives the battery 30 in the battery compartment 58 and supports the battery 30 when the energy storage system 14 is in both an idle state (e.g., while the energy storage system is not mounted to the chassis 18) and in a mounted state (e.g., while the energy storage system 14 is coupled to the chassis 18 for movement therewith).

Figure 3:
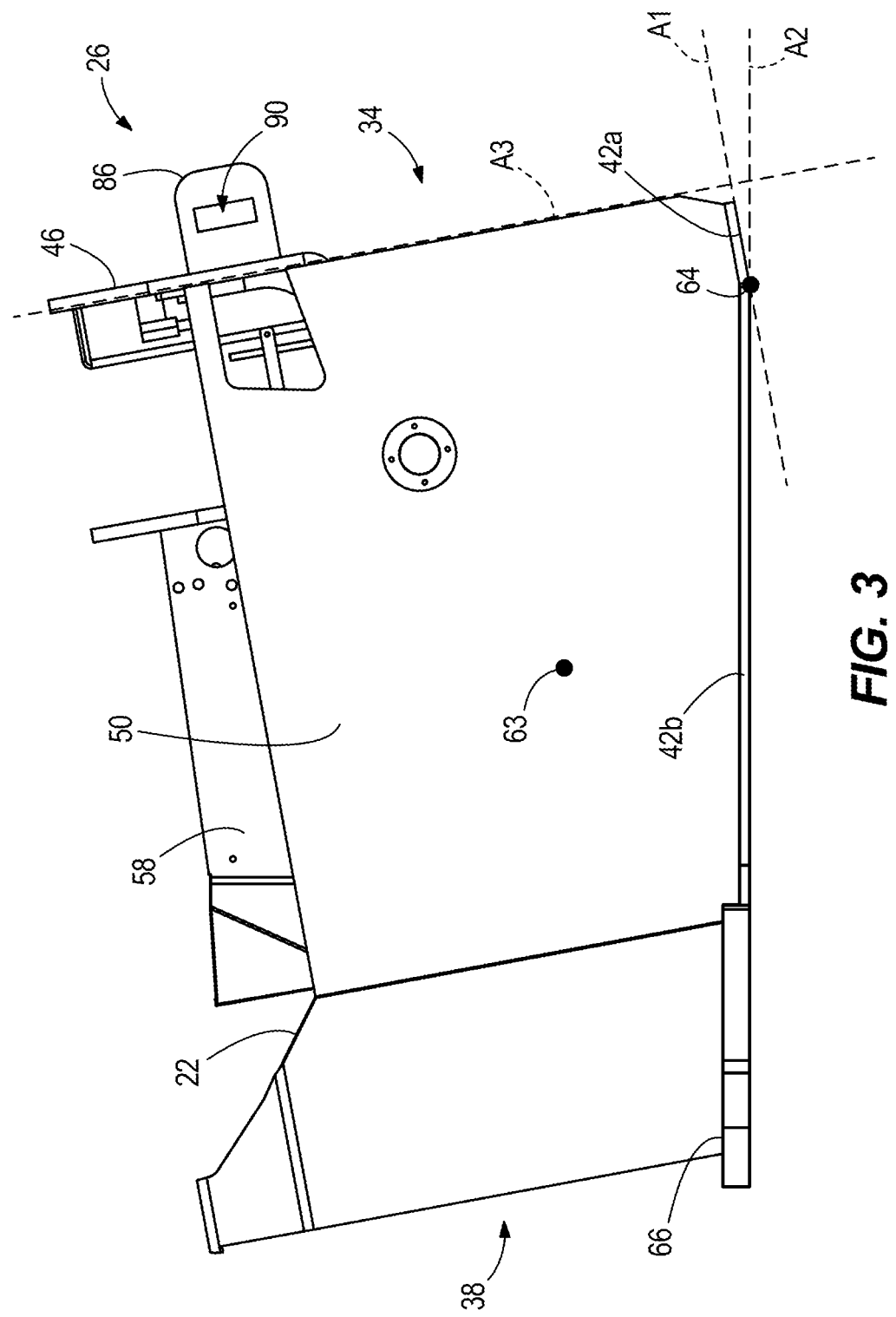
FIG. 3 is a side view of the energy storage system.

Referring now to FIG. 3, the base 42 includes a first base portion 42a and a second base portion 42b. The first base portion 42a extends from the first end 34 of the frame 22 toward the second end 38 of the frame 22. The second base portion 42b extends from the first base portion 42a to the second end 38 of the frame 22. The first base portion 42a defines a first base portion plane A1, and the second base portion 42b defines a second base portion plane A2. The first base portion plane A1 is oriented at an angle relative to the second base portion plane A2.

Figure 10:
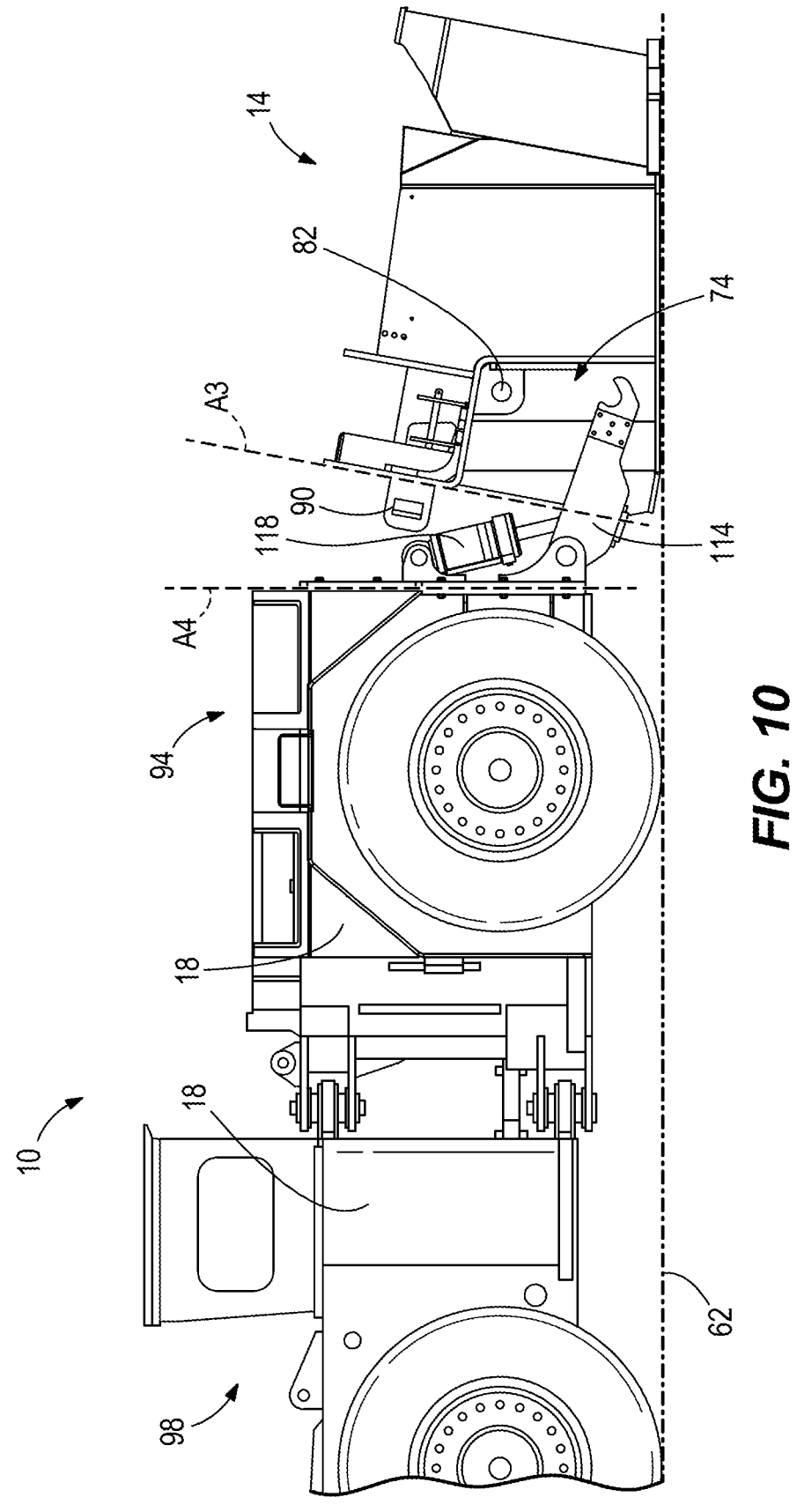
FIG. 10 is a side view illustrating a first stage of coupling the energy storage system to the electric mining machine.

With continued reference to FIG. 3, the second base portion 42b may extend along a greater portion of the base 42 than the first base portion 42a, and at least a portion of the first base portion 42a may be spaced apart from a ground surface 62 (FIG. 10). In the illustrated embodiment, a majority of the weight of the energy storage system 14 is supported by the second base portion 42b while the second base portion 42b rests on a support surface (e.g., the ground surface 62 of FIG. 10). In some embodiments, a center of gravity 63 for the energy storage system 14 is positioned substantially above the second base portion 42b. In the illustrated embodiment, the first base portion 42a and the second base portion 42b meet at a fulcrum 64 (e.g., an edge). The center of gravity 63 for the energy storage system 14 is positioned on a side of the fulcrum 64 that is proximate the second base portion 42b, and gravity biases the frame 22 to cause the second base portion 42b to rest on the ground surface 62.

Figures 4, 5:
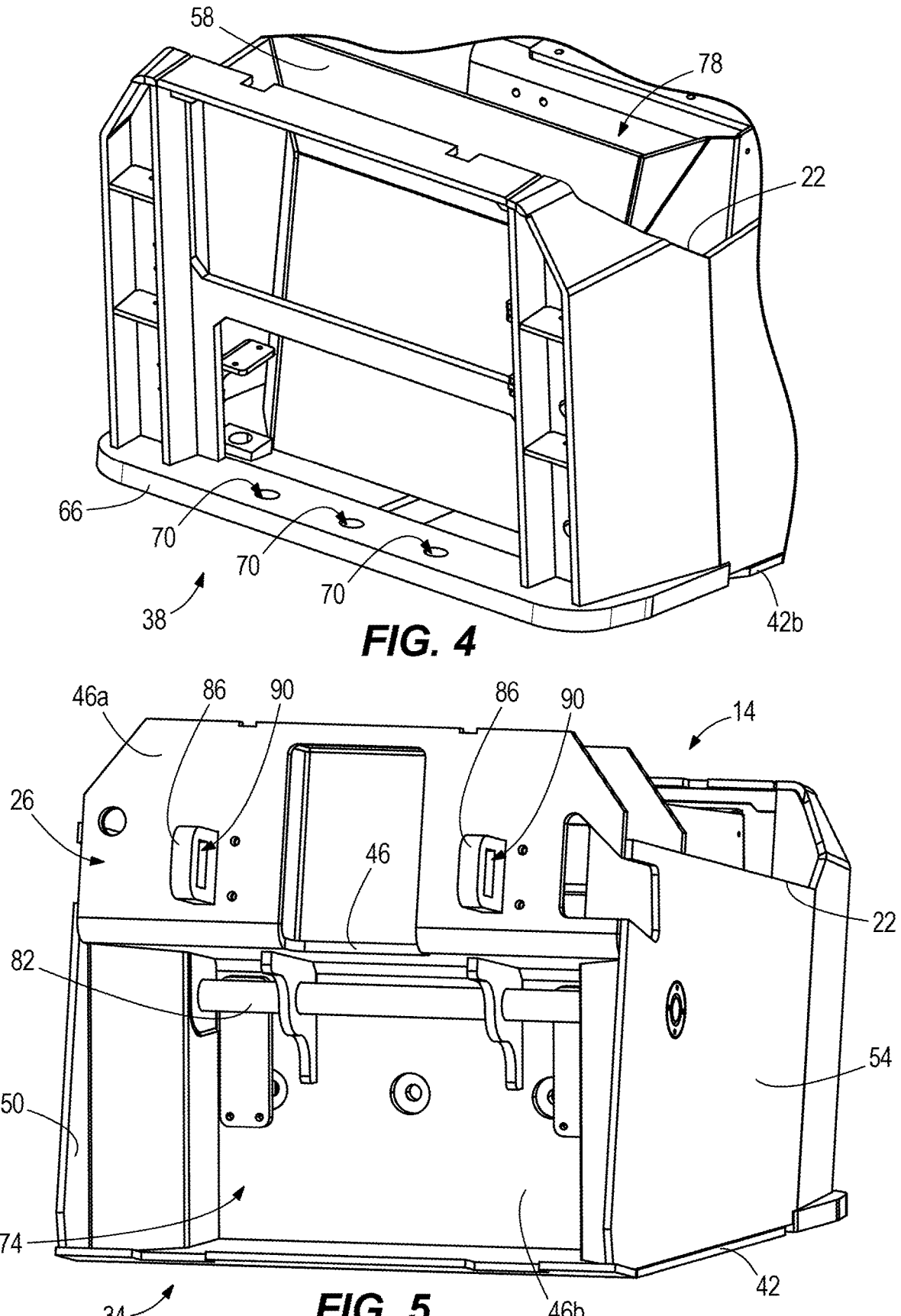
FIG. 4 is another perspective view of a portion of the energy storage system.
FIG. 5 is another perspective view of the energy storage system.

With reference to FIG. 4, the frame 22 may include a bumper 66. For example, in the illustrated embodiment, the second base portion 42b may include a bumper 66 at an end of the second base portion 42b that is opposite from the first base portion 42a (e.g., adjacent the second end 38 of the frame 22). The bumper 66 may include one or more towing apertures 70 that are configured to engage an external machine or device for towing or skidding the frame 22 from one location to another. In some embodiments, the bumper 66 has a greater thickness than the rest of the second base portion 42b to provide support for the frame 22 during a towing operation.

Referring to FIG. 5, the first end 34 of the frame 22 includes a first stepped surface including a first surface 46a and a second surface 46b that is recessed relative to the first surface 46a. The first end 34 defines a first mounting plane A3 (FIG. 3). In the illustrated embodiment, the first surface 46a defines the first mounting plane A3 (FIG. 3), and the first side wall 50 and the second side wall 54 extend from the first mounting plane A1 at the first end 34 of the frame 22 to the second end 38 of the frame 22. A mounting cavity 74 may be formed by the base 42, the first side wall 50, the second side wall 54, and the second surface 46b.

FIG. 5 illustrates the mounting interface 26. In the illustrated embodiment, the mounting interface 26 is positioned adjacent the first end 34 and includes a mounting bar 82 (e.g., a mounting member) and one or more lugs 86. The mounting bar 82 may be positioned in the mounting cavity 74 and extend between the first side wall 50 and the second side wall 54. The lugs 86 protrude from the first surface 46a (e.g., in a direction away from the energy storage system 14). Each lug 86 includes a latch aperture 90. In the illustrated embodiment, the latch apertures 90 are rectangular. In other embodiments, the latch apertures 90 may have another shape (e.g., circular, square-shaped, etc.).

Figure 6:
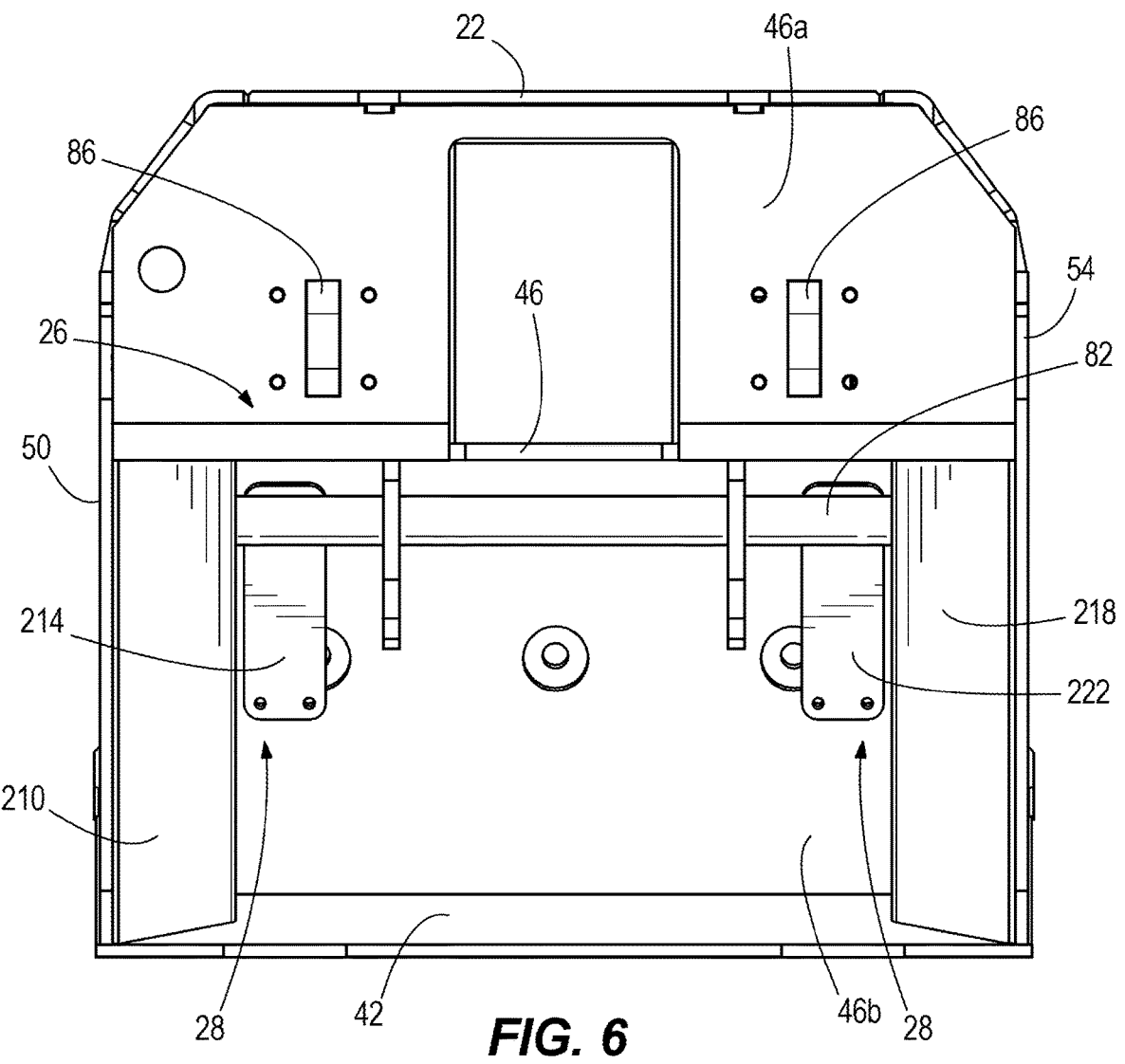
FIG. 6 is an end view of the energy storage system.
Figure 9:
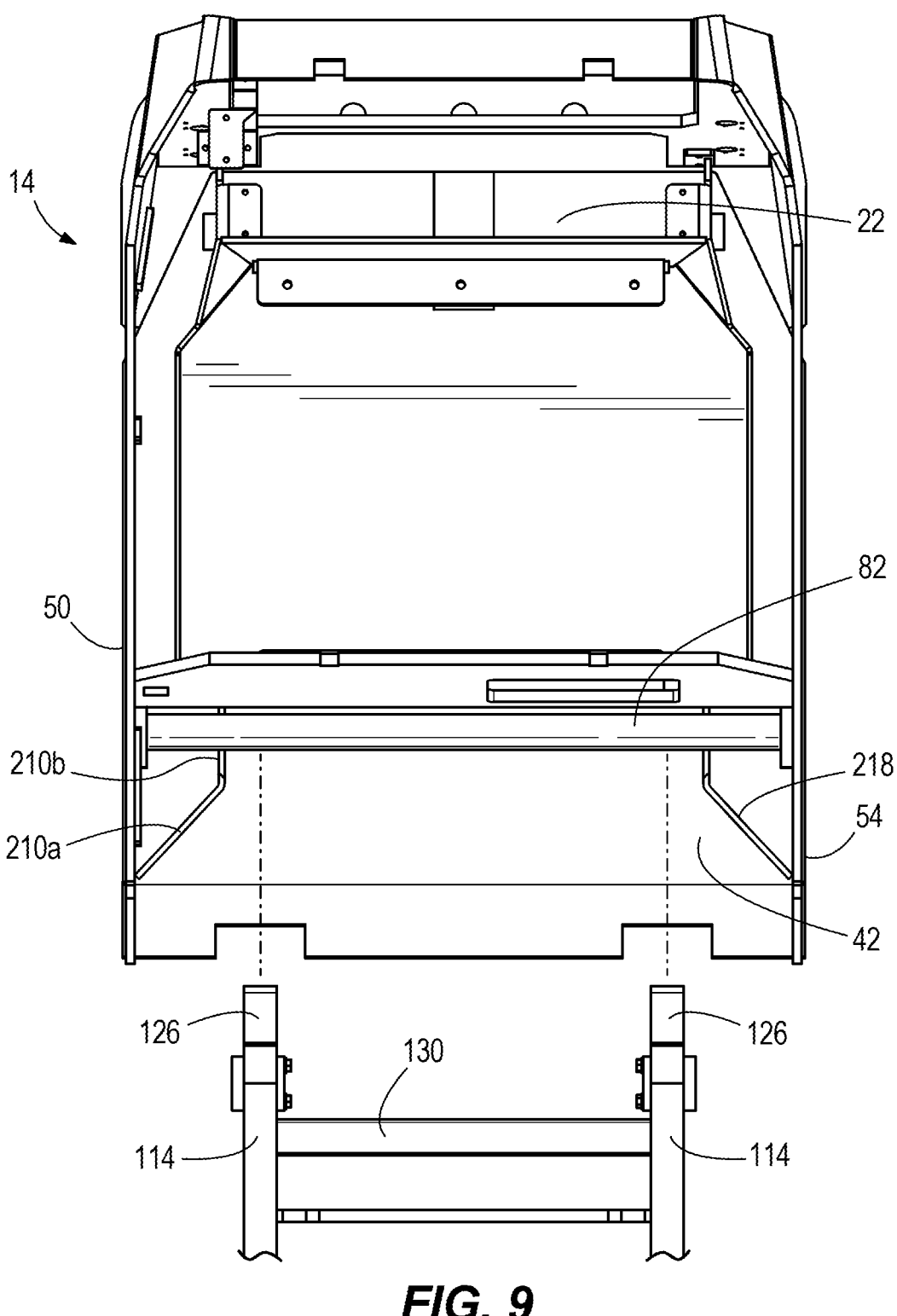
FIG. 9 is a plan view of the battery mounting system.

As shown in FIG. 6, the energy storage system 14 includes an alignment system 28. In the illustrated embodiment, the alignment system 28 includes guide surface 210 and a wear member 214 (e.g., a wear plate). The guide surface 210 is positioned within the mounting cavity 74 between the first side wall 50 and the stepped surface 46. As shown in FIG. 9, the guide surface 210 includes a first or primary guide surface 210a and a second or secondary guide surface 210b. The primary guide surface 210a is positioned adjacent the first side wall 50 and extends inwardly at an acute angle relative to the first side wall 50. The guide surface 210 may be recessed relative to the first end 34 of the frame 22. The secondary guide surface 210b is connected between the primary guide surface 210a and the second surface 46b. In the illustrated embodiment, the secondary guide surface 210b extends perpendicularly to the second surface 46b (e.g., parallel to the first side wall 50). In the illustrated embodiment, the wear member 214 (FIG. 6) is supported on the second surface 46b and positioned adjacent to a location at which the guide surface 210 intersects the second surface 46b.

In the illustrated embodiment, the alignment system 28 includes multiple guide surfaces (e.g., first guide surface 210 and second guide surface 218) and multiple wear members (e.g., first wear member 214 and second wear member 222). The second guide surface 218 is substantially similar to the first guide surface 210 and is positioned adjacent the second side wall 54, extending between the second side wall 54 and the second surface 46b. The mounting bar 82 extends between the first guide surface 210 and the second guide surface 218. In some embodiments, the mounting bar 82 extends between the first side wall 50 and the second side wall 54, through the first guide surface 210 and the second guide surface 218.

With continued reference to FIG. 6, the second wear member 222 is substantially similar to the first wear member 214 and is supported on the second surface 46b and positioned adjacent to a location where the second guide surface 218 intersects the second surface 46b. The first wear member 214 includes an inner edge and an outer edge. The second wear member 222 includes an inner edge and an outer edge. In the illustrated embodiment, the inner edges of the first wear member 214 and the second wear member 222 face each other. The outer edge of the first wear plate 214 faces toward the first guide surface 210, and the outer edge of the second wear member 222 faces toward the second guide surface 218.

Figure 7:
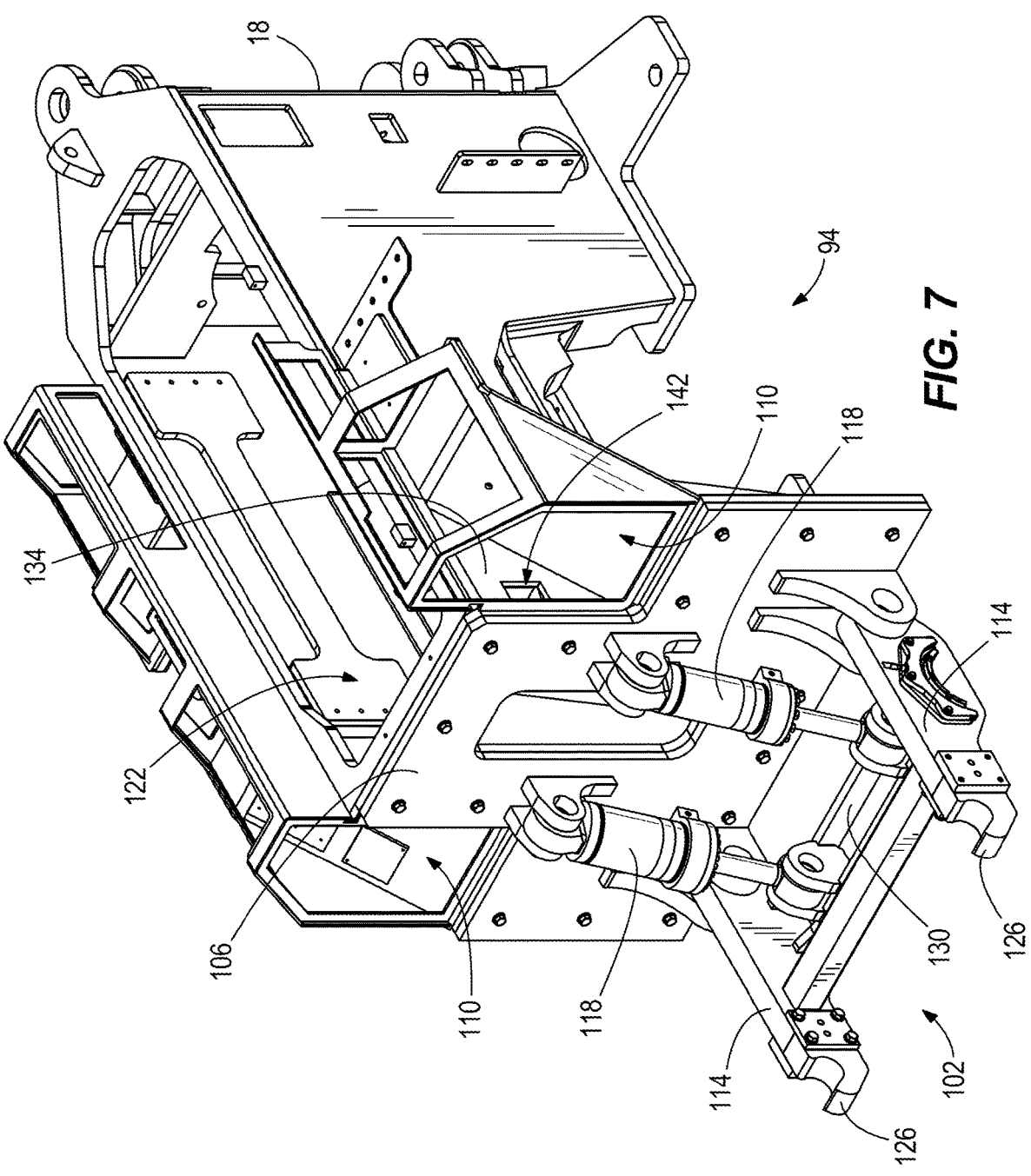
FIG. 7 is a perspective view of a portion of the chassis.

With reference to FIGS. 7 and 10, the chassis 18 includes a rear portion 94 and a forward portion 98. The rear portion 94 is configured to engage the energy storage system 14, and the forward portion 98 may include a working attachment (e.g., a bucket). In the illustrated embodiment, the rear portion 94 of the chassis 18 is pivotable relative to the forward portion 98. The rear portion 94 of the chassis 18 includes another mounting interface 102.

Figure 8:
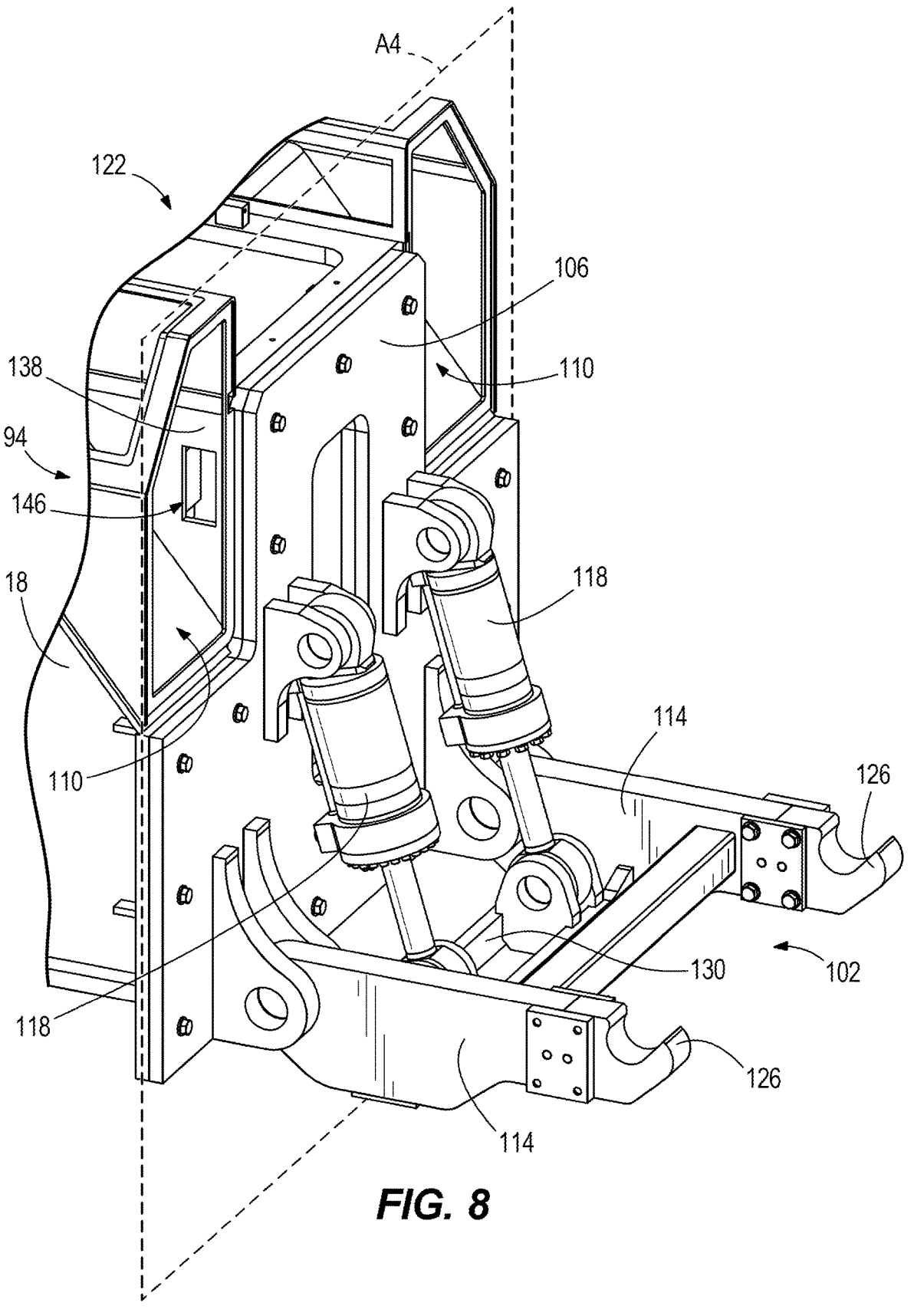
FIG. 8 is a perspective view of a portion of the chassis.

As illustrated in FIGS. 7 and 8, the mounting interface 102 is positioned adjacent a surface 106 of the chassis 18. In the illustrated embodiment, the mounting interface 102 includes latch receptacles 110, mounting arms 114, actuators (e.g., hydraulic cylinders 118), and a locking mechanism 122. The chassis surface 106 is oriented in a second mounting plane A4. When the energy storage system 14 is in the idle state, as illustrated in FIG. 10, at least a portion of the first mounting plane A3 and the second mounting plane A4 are spaced from each other. An orientation of the first mounting plane A3 relative to the second mounting plane A4 may depend on the grade or angle of the ground 62. In the illustrated embodiment, when the energy storage system 14 is in the mounted state (FIG. 14), the first surface 46a and the chassis surface 106 contact each other, and the first mounting plane A3 and the second mounting plane A4 are substantially coincident with one another. As shown in FIGS. 7 and 8, the latch receptacles 110 include openings on the chassis surface 106 that are planarly aligned with the second mounting plane A4. The mounting arms 114 are supported on the chassis 18 for pivoting movement. For example, each of the mounting arms 114 may include an end that is pivotably coupled to the chassis surface 106, and the hydraulic cylinders 118 are operable to move the mounting arms 114.

In the illustrated embodiment, the mounting interface 102 includes two mounting arms 114 and two hydraulic cylinders 118. A latch (e.g., a mounting hook 126) is positioned at an end of each mounting arm 114 that is opposite from the chassis surface 106. The mounting hooks 126 are configured to engage the mounting bar 82 of the energy storage system 14 (FIG. 5). The second mounting interface 102 may include a crossbar 130 extending between the mounting arms 114 to support the mounting arms 114 against loads that are unevenly distributed laterally. Stated another way, the mounting arms 114 may be fixed with respect to one another. In the illustrated embodiment, the distance between the inner edges of the wear member 214, 222 is less than the distance between the mounting arms 114, and the distance between the outer edges of the wear members 214, 222 (FIG. 6) is greater than the distance between the mounting arms 114. In some embodiments, each of the hydraulic cylinders 118 are coupled between the chassis surface 106 and the crossbar 130, and extension and retraction of the hydraulic cylinders 118 causes movement (e.g., pivoting movement) of the crossbar 130 and the mounting arms 114 relative to the chassis surface 106 of mounting arms 114 relative to the mounting plate 106.

With continued reference to FIGS. 7 and 8, the locking mechanism 122 includes a first wall 134, a second wall 138, a first locking aperture 142, and a second locking aperture 146. The first locking aperture 142 is located on the first wall 134. The second locking aperture 146 is located on the second wall 138. The first locking aperture 142 and the second locking aperture 146 have the same shape as the latch apertures 90 (FIG. 6). As such, in the illustrated embodiment, each of the first locking aperture 142, the second locking aperture 146, and the latch apertures 90 (FIG. 6) are rectangular. In other embodiments, the first locking aperture 142, the second locking aperture 146, and the latch apertures 90 (FIG. 6) may have a different shape. In the mounted state, the latch apertures 90 (FIG. 6) align with a corresponding one of the first locking aperture 142 and the second locking aperture 146. The latch apertures 90, the first locking aperture 142, and the second locking aperture 146 are configured to receive a lock bar 150 (FIG. 14) to lock the energy storage system 14 in the mounted state. In some embodiments, the lock bar 150 may extend partially through the latch apertures 90, the first locking aperture 142, and the second locking aperture 146. That is, the lock bar 150 does not extend completely through the latch apertures 90, the first locking aperture 142, and the second locking aperture 146 such that the lock bar 150 wedges the energy storage system 14 to the chassis 18. In other embodiments, the lock bar 150 may extend completely through the latch apertures 90, the first locking aperture 142, and the second locking aperture 146.

In operation, a drive system of the vehicle may be operated to position the chassis 18 such that the mounting arms 114 extend into the mounting cavity 74 of the energy storage system 14 (FIG. 10). As the mounting arms 114 are inserted into the mounting cavity 74, the first guide surface 210 and the second guide surface 218 are configured to guide the mounting arms 114 to the mounting bar 82.

With reference to FIGS. 6 and 9, each of the first guide surface 210 and the second guide surface 218 are configured to guide one of the mounting arms 114 toward a respective one of the first wear member 214 and the second wear member 222. That is, in some instances, the mounting arms 114 initially may be misaligned with the first wear member 214 and the second wear member 222, and the first guide surface 210 and the second guide surface 218 induces or guides the mounting arms 114 toward a desired position to facilitate alignment with the first wear member 214 and the second wear member 222 as the mounting arms 114 are inserted into the mounting cavity 74. For example, if the mounting arms 114 are inserted in an orientation that is skewed toward the first guide surface 210, engagement between one of the mounting arms 114 and the first guide surface 210 causes relative movement between the mounting arms 114 and the frame 22 into an orientation in which the mounting arms 114 are aligned with the wear members 214, 222.

Figure 11:
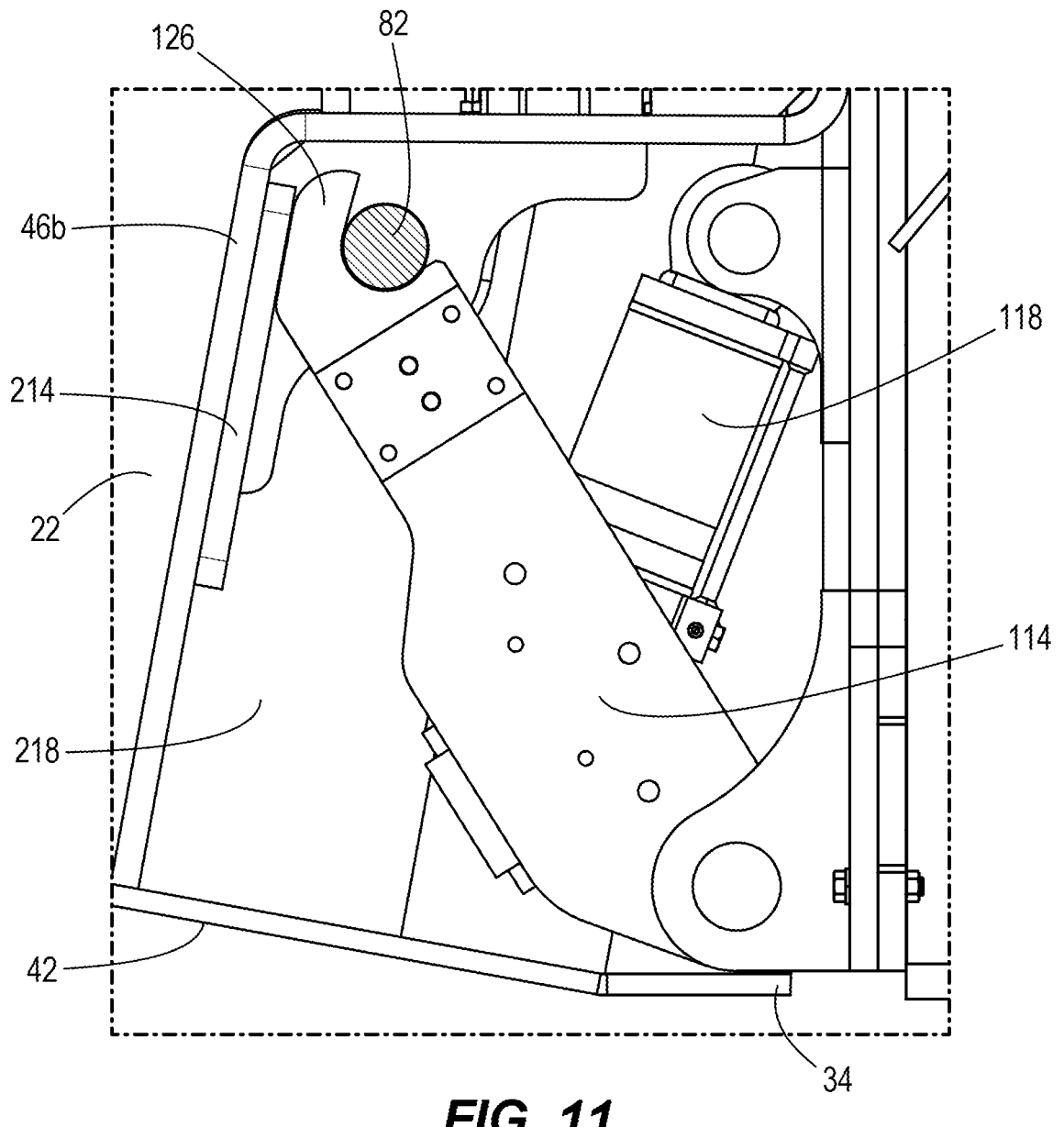
FIG. 11 is an enlarged side view of the battery mounting system.
Figure 12:
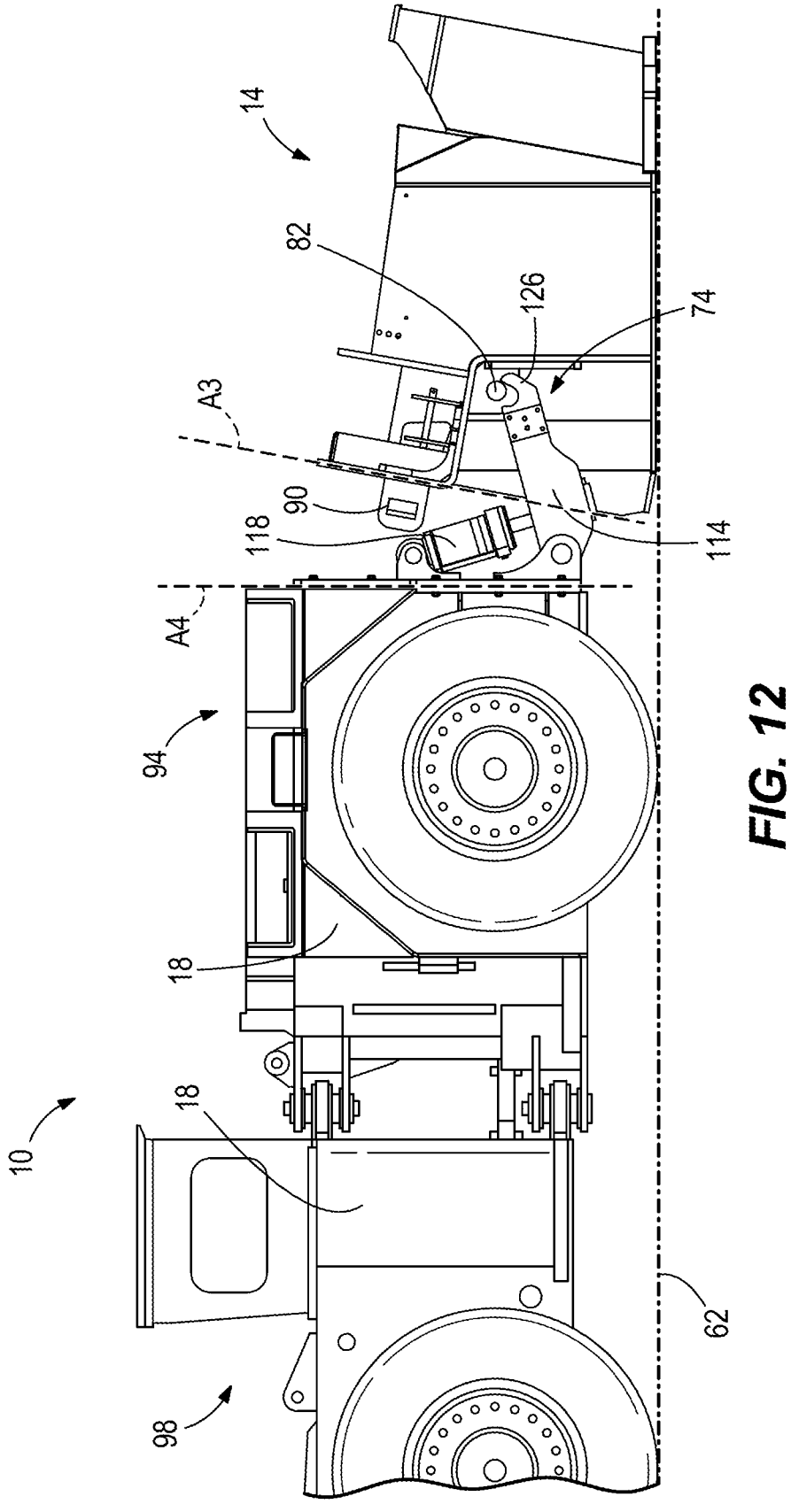
FIG. 12 is a side view illustrating a second stage of coupling the energy storage system to the electric mining machine.
Figure 13:
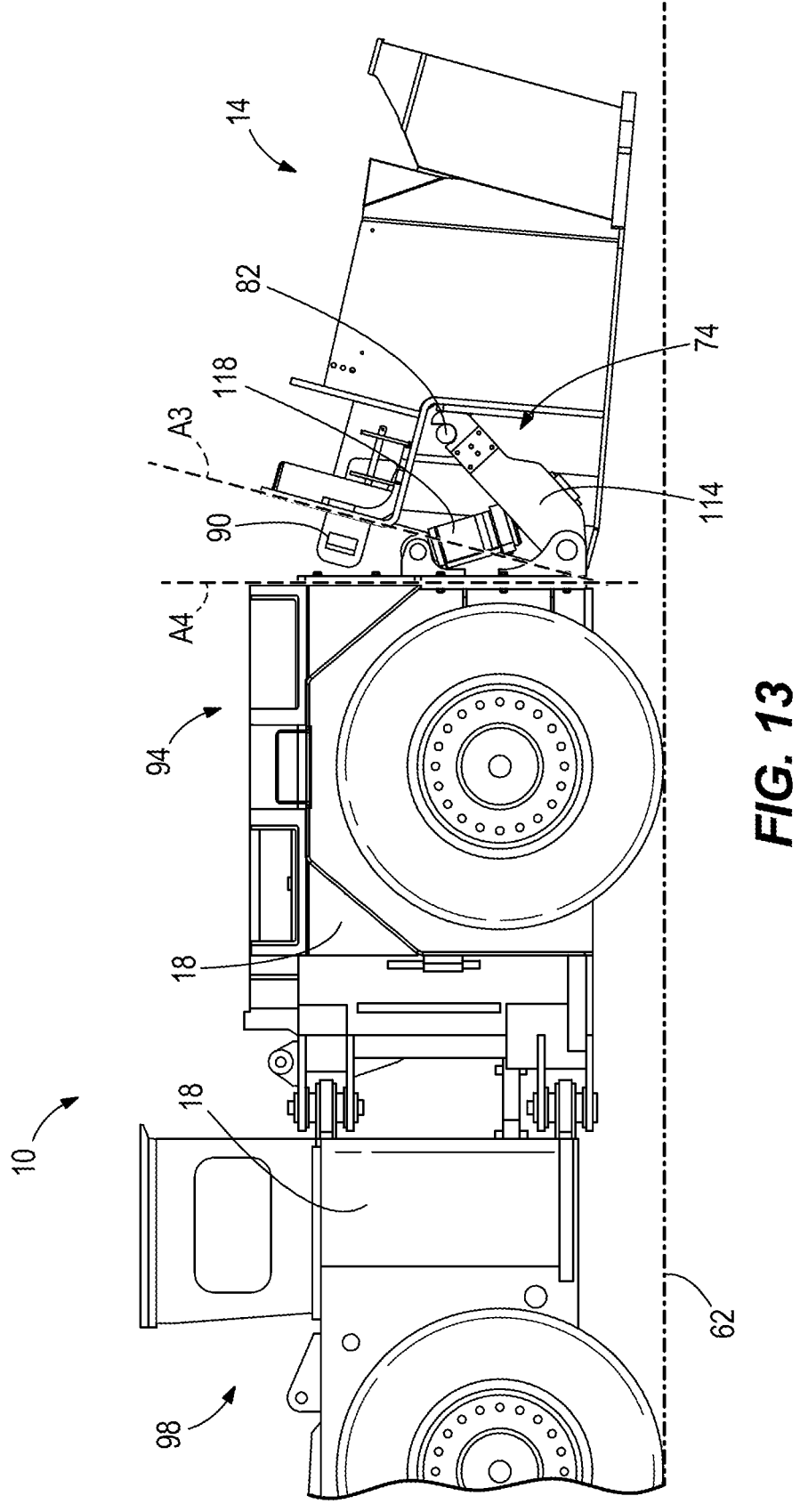
FIG. 13 is a side view illustrating a third stage of coupling the energy storage system to the electric mining machine.

With reference to FIGS. 11-13, the user may then actuate the plurality of hydraulic cylinders 118 to adjust or rotate the plurality of mounting arms 114 relative to the chassis surface 106 into engagement with the mounting bar 82 of the energy storage system 14. Specifically, the user may rotate the plurality of mounting arms 114 such that the mounting hooks 126 of the plurality of mounting arms 114 slide along a respective one of the first wear member 214 and the second wear member 222 until the mounting hooks 126 engage the mounting bar 82. Once the mounting arms 114 are engaged with the mounting bar 82, the plurality of mounting arms 114 may be pivoted toward the rear portion 94 of the chassis 18 to lift the energy storage system 14 off of the ground surface 62 and into the mounted state. That is, once the mounting hooks 126 are engaged with the mounting bar 82, further rotation of the mounting arms 114 may also rotate the energy storage system 14.

The hydraulic cylinders 118 can be actuated to adjust or rotate the mounting arms 114 relative to the chassis surface 106 into engagement with the mounting bar 82 of the energy storage system 14. The mounting arms 114 can rotate and the mounting hooks 126 of the mounting arms 114 can slide along a respective one of the first wear member 214 and the second wear member 222 to engage the mounting bar 82. Once the mounting arms 114 are engaged with the mounting bar 82, the mounting arms 114 rotate toward the rear portion 94 of the chassis 18 to lift the energy storage system 14 off of the ground surface 62 and into the mounted state. While the mounting hooks 126 are engaged with the mounting bar 82, rotation of the mounting arms 114 also moves the energy storage system 14.

Figure 14:
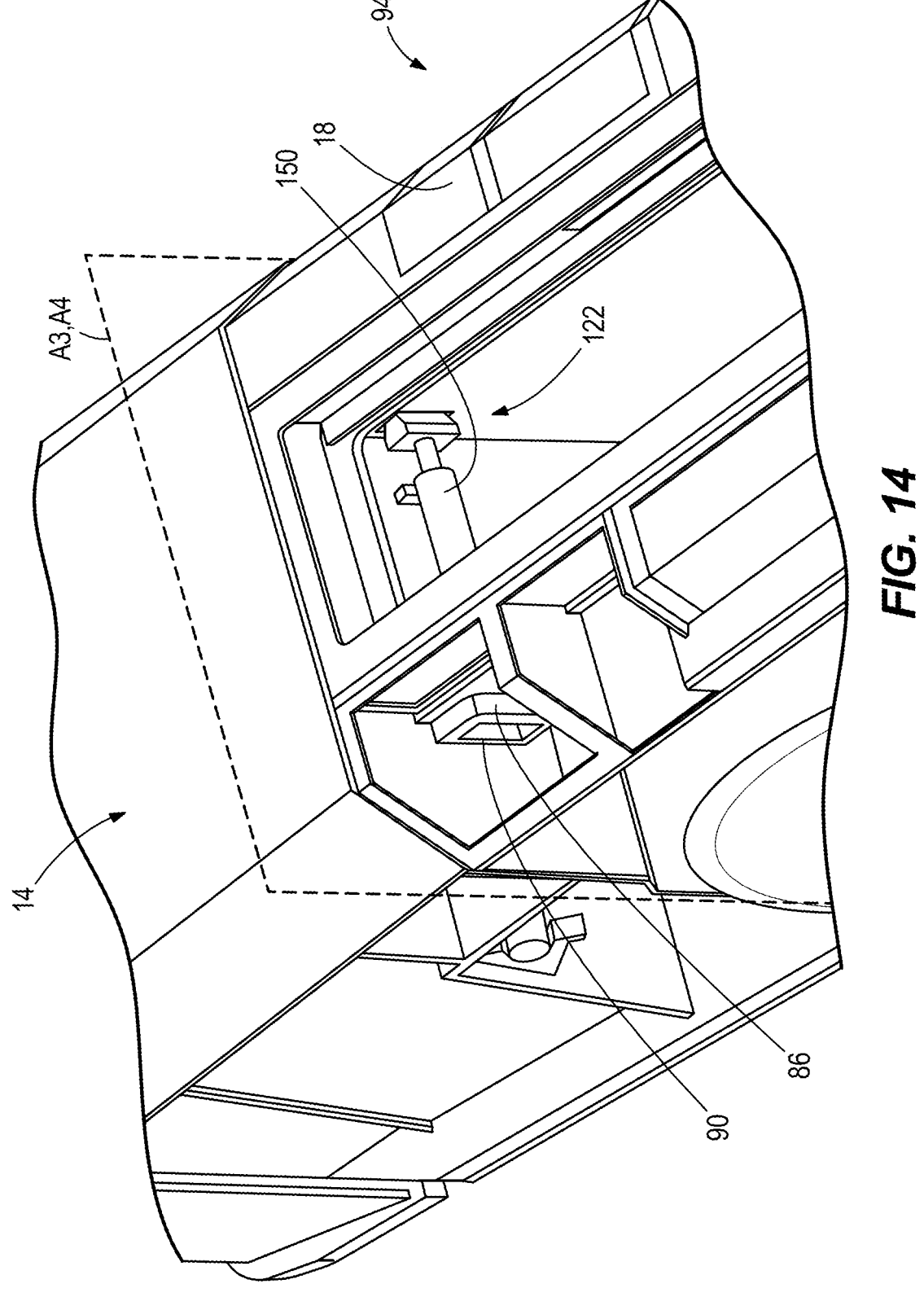
FIG. 14 is a perspective view illustrating a stage of securing the energy storage system to the electric mining machine.
Figure 15:
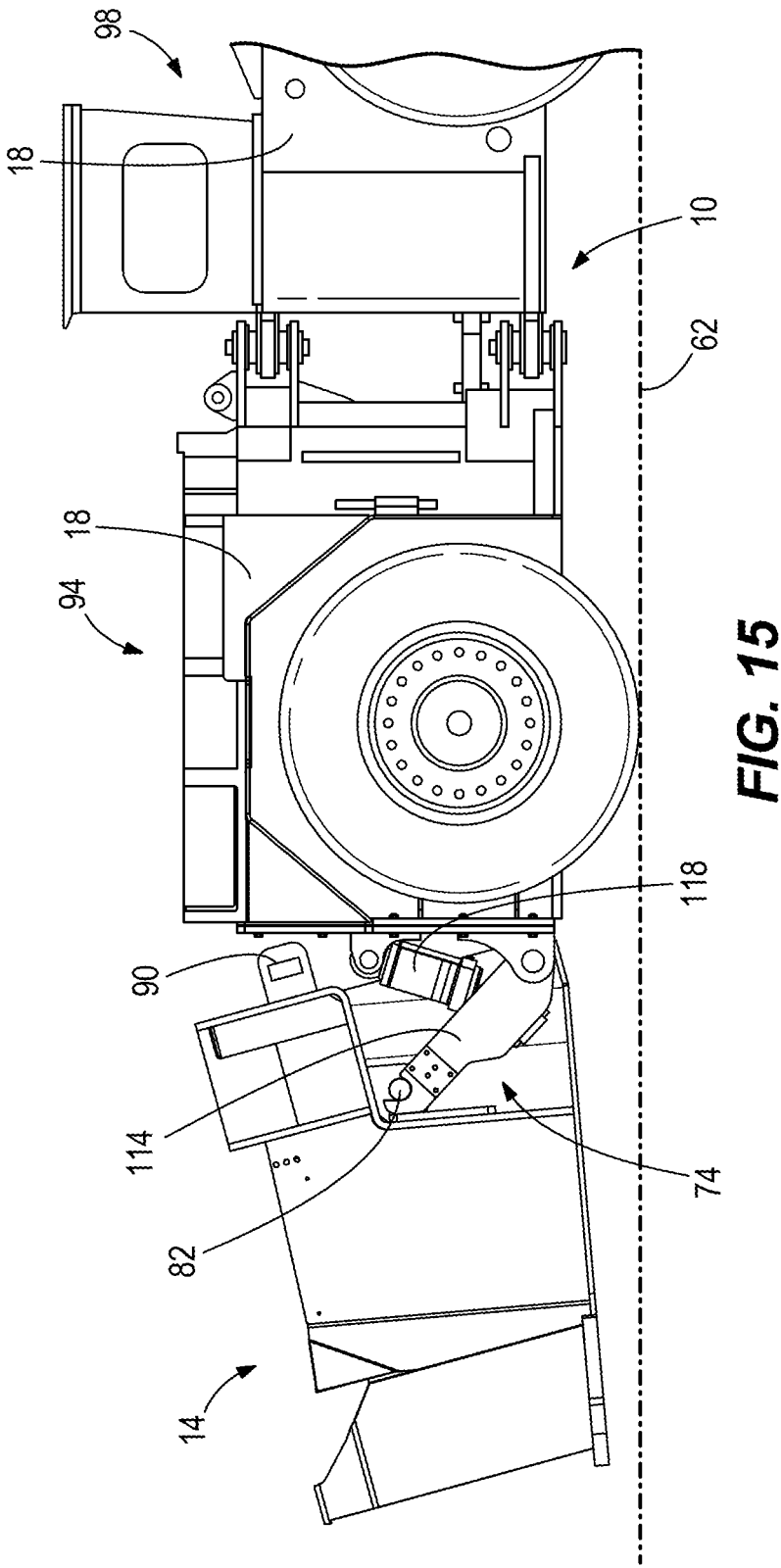
FIG. 15 is a side view illustrating a first stage during uncoupling of the energy storage system from the electric mining machine.

As the mounting arms 114 rotate the energy storage system 14, the energy storage system 14 is moved from the idle state, in which the first mounting plane A3 is angled relative to the second mounting plane A4, to the mounted state, in which the base 42 is lifted from the ground surface 62 and the first mounting plane A3 and the second mounting plane A4 are coincident, as illustrated in FIG. 14. In the mounted state, each of the lugs 86 extends into a corresponding latch receptacle 110 (e.g., as illustrated in FIG. 7). Specifically, with reference to FIGS. 5, 7, and 8, the lugs 86 extend into the latch receptacles 110 such that the latch apertures 90 are aligned with the first locking aperture 142 and the second locking aperture 146.

As illustrated in FIG. 14, once the energy storage system 14 is in the mounted state, the locking mechanism 122 can be actuated to secure the energy storage system 14 to the chassis 18. To activate the locking mechanism 122, the lock bar 150 may be extended through the latch apertures 90, the first locking aperture 142 (FIG. 7), and the second locking aperture 146 (FIG. 8). In some embodiments, the chassis 18 may have a control input (e.g., a switch) for extending the lock bar 150 through the latch apertures 90, the first locking aperture 142 (FIG. 7), and the second locking aperture 146 (FIG. 8). In some embodiments, the locking mechanism 122 may be activated automatically. For example, a sensor such as a proximity sensor may provides a signal to a controller that actuates or moves the lock bar 150 through the latch apertures 90, the first locking aperture 142 (FIG. 7), and the second locking aperture 146 (FIG. 8) when the sensor detects that the lugs 86 have entered the latch receptacles 110 (FIG. 7).

Figure 16:
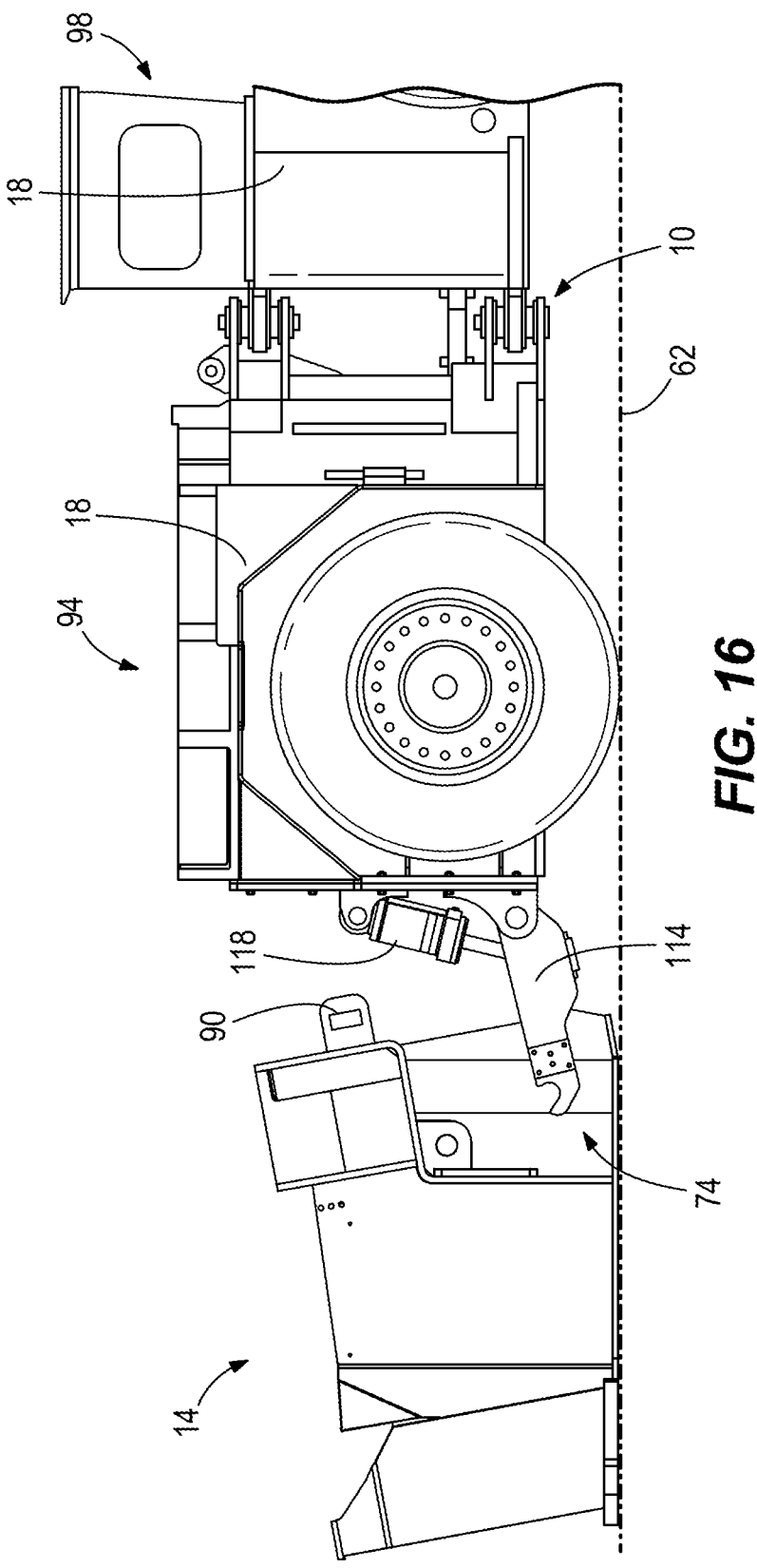
FIG. 16 is a side view illustrating a second stage during uncoupling of the energy storage system from the electric mining machine.
Figure 17:
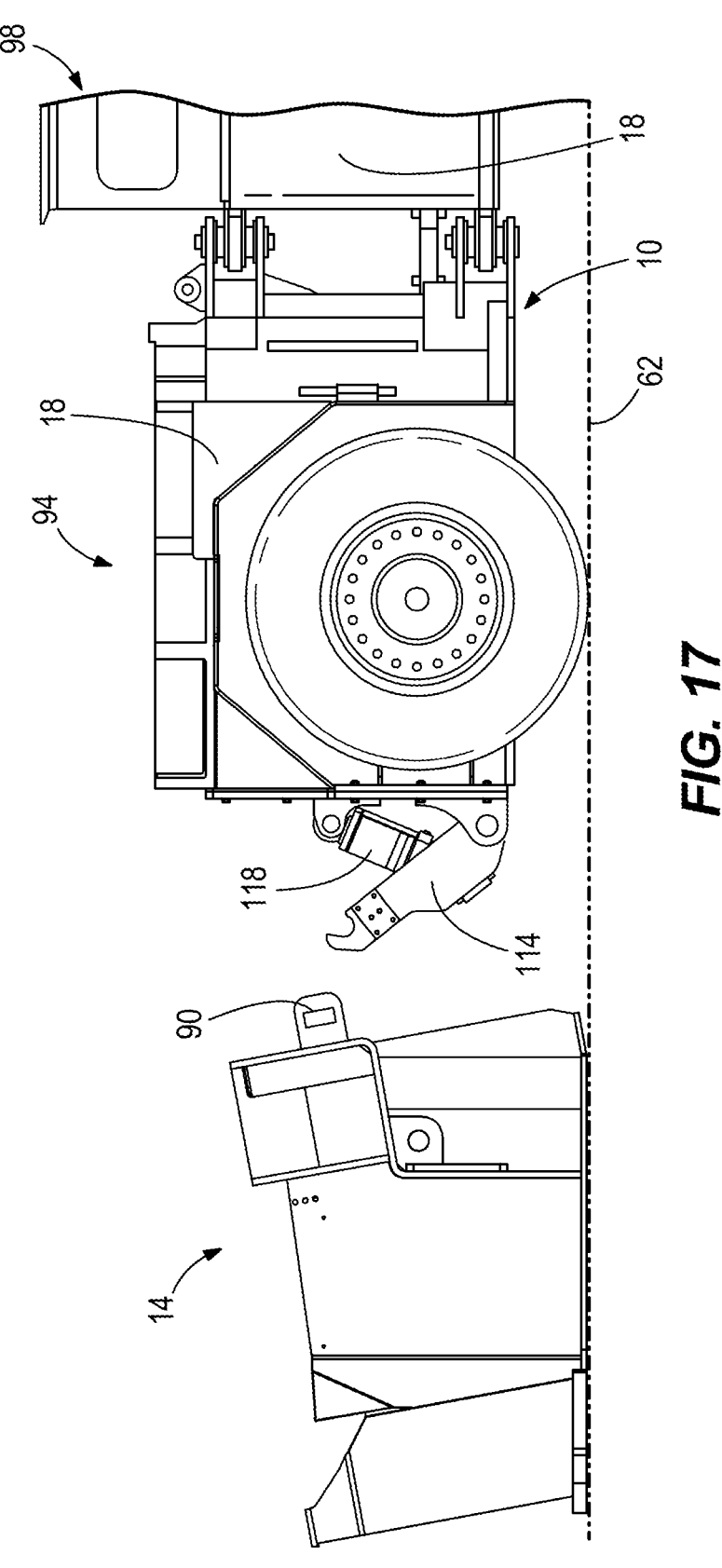
FIG. 17 is a side view illustrating a third stage during uncoupling of the energy storage system from the electric mining machine.

To remove the energy storage system 14 from the chassis 18, the chassis 18 is operated to position the energy storage system 14 at a desired location (e.g., on a ground surface 62). The locking mechanism 122 is deactivated, and the hydraulic cylinders 118 are actuated to rotate the mounting arms 114 away from the rear portion 94 of the chassis 18 until the base 42 of the energy storage system 14 reaches the ground surface 62. As illustrated in FIG. 16, once the base 42 of the energy storage system 14 rests on the ground surface 62, the hydraulic cylinders 118 may be further actuated to disengage the mounting arms 114 from the mounting bar 82. The chassis 18 may be operated (e.g., by an auxiliary power source, such as an onboard battery) to drive away from the energy storage system 14.

In some applications, the energy storage system 14 may need to be moved without the use of the chassis 18. A machine or device may be used having hooks (not illustrated) configured to attached or coupled to the apertures 70 (FIG. 4). With the hooks attached to the apertures 70, the machine may move the energy storage system 14 to a new location (e.g., by skidding the energy storage system).

The frame 22 of the energy storage system 14 facilitates mounting the energy storage system 14 onto the chassis 18 whether the energy storage system 14 is positioned on smooth ground surfaces 62 and/or uneven ground surfaces 62. The frame 22 of the energy storage system 14 enables the energy storage system 14 on uneven and variable ground surfaces 62 without inhibiting or worsening the ability of the chassis 18 to mount the energy storage system 14 to the chassis 18. Therefore, the energy storage system 14 does not require a designated loading area and may be placed upon the ground surface 62 anywhere within a mine. The chassis 18 does not have to travel back and forth to a designated loading zone each time a battery change is needed, thereby reducing the total amount of time loading and unloading the energy storage system 14 takes.

Although certain aspects have been described with reference to certain examples, variations and modifications exist within the spirit and scope of one or more independent aspects. Various features and aspects are set forth in the following claims.

What is claimed is:

1. An energy storage system that is removably coupled to a vehicle, the energy storage system comprising:
   a frame including a base configured to rest on a surface while the frame is uncoupled from the vehicle, and a first mounting feature configured to engage a complementary second mounting feature positioned on the vehicle, the first mounting feature including a bar extending within a mounting cavity between a first side of the frame and a second side of the frame;
   a battery supported on the frame, the battery configured to provide power to the vehicle while the energy storage system is coupled to the vehicle; and
   a frame alignment system including a guide surface extending into the mounting cavity adjacent the first side of the frame, the guide surface configured to engage the second mounting feature as the frame is coupled to the vehicle, the engagement between the guide surface and the second mounting feature facilitating alignment between the first mounting feature and the second mounting feature.

2. The energy storage system of claim 1, wherein the frame alignment system includes a wear member supported in the mounting cavity proximate the bar, the wear member configured to engage an end of the second mounting feature.

3. The energy storage system of claim 2, wherein the guide surface is a first guide surface positioned adjacent the first side of the frame, and wherein the wear member is a first wear member positioned adjacent an inner end of the first guide surface, and the frame alignment system further includes a second guide surface positioned adjacent the second side of the frame, and a second wear member supported in the mounting cavity proximate the bar and positioned adjacent an inner end of the second guide surface.

4. The energy storage system of claim 3, wherein the bar extends from a first sidewall, through the first guide surface and the second guide surface.

5. The energy storage system of claim 1, wherein the mounting cavity is defined in an end surface of the frame and includes a recessed surface stepped from the end surface, and wherein the guide surface extends from a side surface toward the recessed surface.

6. The energy storage system of claim 1, wherein the guide surface includes a first portion and a second portion, the first portion oriented at an acute angle relative to the first side of the frame and extending inwardly from the first side of the frame, the second portion oriented substantially parallel to the first side of the frame.

7. The energy storage system of claim 1, wherein the guide surface is positioned adjacent an end surface of the frame and recessed relative to the end surface.

8. A system for coupling an energy storage system to a vehicle, the system comprising:
   a first mounting interface configured to be positioned on one of the energy storage system and the vehicle, the first mounting interface including a mounting member positioned in a mounting cavity defined in an end surface of the one of the energy storage system and the vehicle;
   a second mounting interface configured to be positioned on the other of the energy storage system and the vehicle, the second mounting interface including an arm and a latch member coupled to the arm, the latch member engageable with the mounting member; and
   a frame alignment system positioned on one of the energy storage system and the vehicle, the frame alignment system including a guide surface extending into the mounting cavity, the guide surface configured to guide the arm into the mounting cavity toward the mounting member.

9. The system of claim 8, wherein the latch member includes a mounting hook positioned adjacent an end of the arm.

10. The system of claim 8, wherein the arm is a first arm, the second mounting interface including a second arm and a crossbar connecting the first arm and the second arm such that a position of the first arm relative to the second arm is fixed.

11. The system of claim 10, wherein the guide surface is configured to induce adjustment of the first arm relative to the mounting member, the guide surface inducing a corollary position adjustment of the second arm as the position of the first arm is adjusted.

12. The system of claim 11, wherein the guide surface is a first guide surface, the frame alignment system including a second guide surface extending into the mounting cavity and configured to induce adjustment of the second arm relative to the mounting member, the second guide surface inducing a corollary position adjustment of the first arm as the position of the second arm is adjusted.

13. The system of claim 12, wherein the frame alignment system includes a first wear member positioned in the mounting cavity and engageable with the first arm and a second wear member positioned in the mounting cavity and engageable with the second arm, and wherein each of the first wear member and the second wear member has an inner edge and an outer edge such that the inner edges of the first wear member and the second wear member face each other.

14. The system of claim 13, wherein a first distance between the inner edges of the first wear member and the second wear member is less than a second distance between the first arm and the second arm, and wherein a third distance between the outer edge of the first wear member and the outer edge of the second wear member is greater than the second distance between the first arm and the second arm.

15. The system of claim 11, wherein the frame alignment system includes a wear member supported in the mounting cavity adjacent an inner edge of the guide surface, and wherein engagement of the arm and the guide surface guides the arm into the mounting cavity toward the wear member.

16. The system of claim 8, wherein the second mounting interface includes an actuator operable to rotate the arm into engagement with the mounting member to lift and mount the energy storage system to the vehicle.

17. A method of mounting an energy storage system to a vehicle, the method comprising:

positioning the vehicle adjacent the energy storage system;

operating the vehicle to move an arm positioned on the vehicle toward the energy storage system;

engaging, with the arm, a guide surface extending into a mounting cavity defined in an end surface of the energy storage system to align the arm with a mounting bar extending within the mounting cavity between a first side of the energy storage system and a second side of the energy storage system; and rotating the arm into engagement with the mounting bar.

18. The method of claim 17, wherein rotating the arm into engagement with the mounting bar causes a latch coupled to the arm to engage a wear member.

19. The method of claim 17, further comprising pivoting the arm, thereby lifting the energy storage system and causing the end surface of the energy storage system to be drawn against an end surface of the vehicle.

20. The energy storage system of claim 7, further comprising mounting lugs protruding outwardly from the end surface and configured to extend into receptacles on the vehicle.

21. The system of claim 16, wherein:

the frame alignment system includes a wear member supported in the mounting cavity adjacent an inner edge of the guide surface, engagement of the arm and the guide surface guides the arm into the mounting cavity toward the wear member, and the arm slides against the wear member during rotation into engagement with the mounting member.

* * * * *